United States Patent
Kawauchi et al.

(10) Patent No.: US 6,333,608 B1
(45) Date of Patent: Dec. 25, 2001

(54) DRIVING APPARATUS FOR VEHICULAR DISPLAY UNIT

(75) Inventors: Masaaki Kawauchi, Kariya; Muneaki Matsumoto, Okazaki; Masahiko Osada, Hekinan; Noriyuki Mase, Handa, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/658,474

(22) Filed: Sep. 8, 2000

(30) Foreign Application Priority Data

Sep. 10, 1999 (JP) ................................................ 11-257357

(51) Int. Cl.$^7$ ...................................................... G05F 1/00
(52) U.S. Cl. ...................... 315/308; 315/291; 315/169.2; 315/169.3; 315/77; 340/825.81; 345/84; 345/204
(58) Field of Search .............................. 315/169.1, 169.2, 315/169.3, 241 R, 77, 291, 308; 345/55, 76, 77, 80, 84, 103, 204; 340/825.63, 825.65, 825.81, 825.87, 825.89, 995

(56) References Cited

U.S. PATENT DOCUMENTS

| | | | |
|---|---|---|---|
| 4,914,353 | * 4/1990 | Harada et al. ..................... | 315/169.3 |
| 4,965,574 | * 10/1990 | Fukushima et al. ................. | 340/995 |
| 5,006,838 | * 4/1991 | Fujioka et al. ................. | 315/169.3 X |
| 5,847,516 | 12/1998 | Kishita et al. ..................... | 315/169.3 |
| 5,973,456 | 10/1999 | Osada et al. ....................... | 315/169.1 |
| 6,064,158 | 5/2000 | Kishita et al. ..................... | 315/169.3 |

FOREIGN PATENT DOCUMENTS

B2-58-51277    11/1983    (JP) .

* cited by examiner

*Primary Examiner*—Haissa Philogene
(74) *Attorney, Agent, or Firm*—Law Offices of David G. Posz

(57) ABSTRACT

A driving apparatus for vehicular display unit which can adequately perform dimming control in both daytime display condition and nighttime display condition. A controller changes a charging time of EL elements by changing a pulse width of a PC bar signal based on a day/night switching signal D/N in a scanning signal generator. When a display condition of El panel is switched from daytime display condition to nighttime display condition, the controller changes a driving frequency in a HSYNC bar signal generator. The controller also changes the driving frequency during the daytime display period when it is required to dim at multi-steps with relatively small changing.

10 Claims, 9 Drawing Sheets

DRIVING APPARATUS FOR VEHICULAR DISPLAY UNIT

CROSS REFERENCE TO RELATED APPLICATION

This application is based upon Japanese Patent Application No. Hei. 11-257357 filed on Sep. 10, 1999, the contents of which are incorporated herein by reference.

BACKGROUND OF THE INVENTION

1. Field of the Invention:

This invention relates to driving apparatuses for vehicular display unit, and particular to a driving apparatus for vehicular display unit used in, for example, a vehicular instrument panel.

2. Related Art:

As a vehicular display unit, there is known a direct dot matrix type display in which EL (electro luminescence) elements are used as picture elements. The direct dot matrix type display has scanning electrodes, data electrodes crossing with the scanning electrodes, and EL (electro luminescence) element sandwiched between the scanning electrodes and the data electrodes. The picture elements defined at intersections between the scanning electrodes and the data electrodes are emitted by respectively applying power between the scanning electrodes and the data electrodes.

As a brightness modulation (dimming control) method of this kind of display unit, amplitude of applied voltage, pulse width (duty ratio), or frequency is changed. For example, according to Japanese examined patent application 58-51277, after the picture elements of the display unit are emitted by applying high voltage writing pulse between the scanning electrodes and the data electrodes, a holding pulse lower than the writing pulse is applied therebetween. At this time, the pulse width or frequency of the holding pulse is changed to modulate the brightness.

However, when the brightness of the display unit is uniformly controlled over whole screen by changing the pulse width or the amplitude of the applied voltage pulse, the brightness may become uneven due to deviation of a brightness-applied voltage (L-V) characteristic among each picture element or deviation of a driver IC. Moreover, in a case where the frequency of the applied voltage pulse is changed to control the brightness, when the frequency is set less than 60 Hz, flicker may occur and therefore visibility may decrease. In other words, a controllable range of the brightness may be restricted when either of these techniques is used.

When such a display unit is applied to the instrument panel of the vehicle, and when a driver actually drives this vehicle, illumination surrounding the vehicle is considerably different between daytime and nighttime. Hence, it needs to largely change the brightness range in accordance with the difference in brightness. In detail, since the illumination is large during daytime, it needs to set the brightness of the display panel to high level to improve the visibility by the driver. On the contrary, since the illumination is small during nighttime, the visibility can be secured even if the brightness of the display panel is set to low level.

In order to control the brightness of the display panel over wide range, it can be thought to combine the techniques described in the above. However, even when the display panel deteriorates with time, a response of the brightness with respect to the amplitude, pulse width, or the frequency of the applied voltage pulse does not uniformly deteriorate. Therefore, when a display for daytime and a display for nighttime are switched, a relationship of brightness may be reversed.

SUMMARY OF THE INVENTION

This invention has been conceived in view of the background thus far described and its first object is to adequately perform dimming control in both daytime display period and nighttime display period.

Its second object is to adequately switch a dimming condition between a daytime display condition and a nighttime display condition.

Its third object is to achieve the first object and the second object at a same time.

According to a first aspect of the present invention, a display controller switches a display condition of the display unit between a daytime display condition and a nighttime display condition. Furthermore, the display controller controls the first dimming controller to dim the display unit during both a daytime display period and a nighttime display period. The display controller controls the second dimming controller to dim the display unit when the display condition of the display unit is switched between the daytime display condition and the nighttime display condition.

Since the display controller selectively performs the dimming control suitable for adjusting brightness range in accordance with the time, the place, and the occasion, the dimming control of the display unit can be adequately performed through daytime and nighttime.

According to a second aspect of the present invention, a driving frequency changing unit dims the display unit in plural dimming steps, during both a daytime display period and a nighttime display period, and a pulse width changing unit dims the display unit when the display condition of the display unit is switched between the daytime display condition and the nighttime display condition. In other words, in each of the daytime display period and the nighttime display period during which the dimming control is required to be performed in multi steps with a relatively small changing step, the dimming control is performed by changing the frequency of the scanning signals. In a switching of the display condition in which it needs to change the brightness in relatively large changing step, the dimming control is performed by changing the pulse width of the scanning signals.

Since the display controller selectively performs the dimming control suitable for adjusting brightness range in accordance with the time, the place, and the occasion, the dimming control of the display unit can be adequately performed through daytime and nighttime.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

First Embodiment

Figure 1:
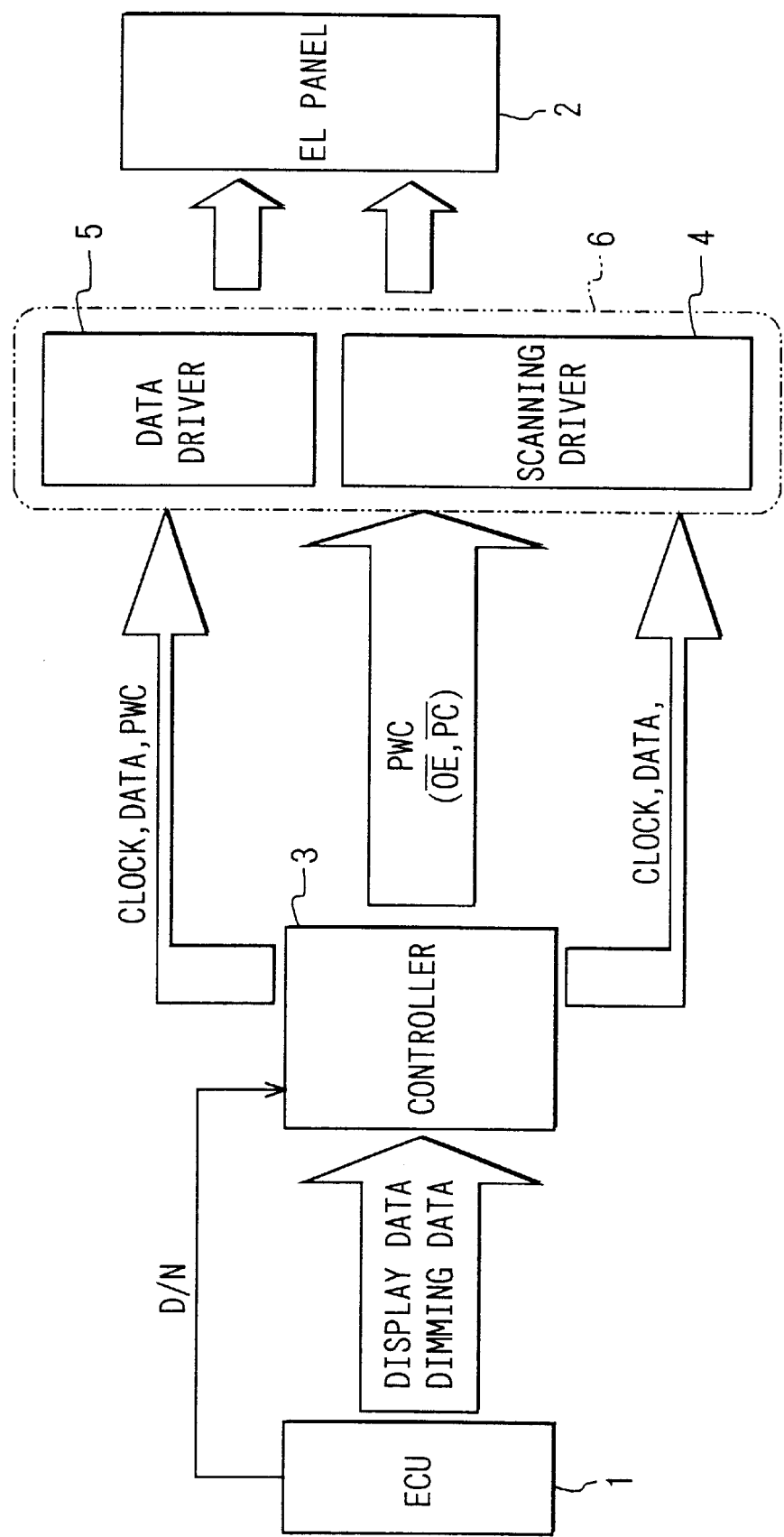
FIG. 1 is a schematic functional block diagram illustrating a driving apparatus for vehicular display unit of a first embodiment according to the present invention.

Hereinafter, a first embodiment in which the present invention is applied to a dot matrix type EL panel will be explained with reference to FIGS. 1 to 7. FIG. 1 shows a schematic functional block diagram illustrating the dot matrix type EL panel. An ECU (Electric Control Unit) 1 is mainly made up of microcomputer, and controls an engine of a vehicle by receiving signals from several kinds of sensors or switches which are provided in the vehicle. The ECU 1 outputs display data and dimming data for the EL panel (vehicular display unit) 2 to a controller 3 (display control means).

The controller 3 generates signals for controlling a driving circuit 6 based on the data provided from the ECU 1 and outputs the signal to the driving circuit 6. The driving circuit 6 has a scanning driver (first voltage apply means) 4 and a data driver (second voltage apply means) 5. The controller 3 generates output enable signal OE and polarity reverse signal PC based on day/night switching signal D/N outputted from the ECU 1, and outputs them to the scanning driver 4 as pulse width control signal PWC.

Figure 2:
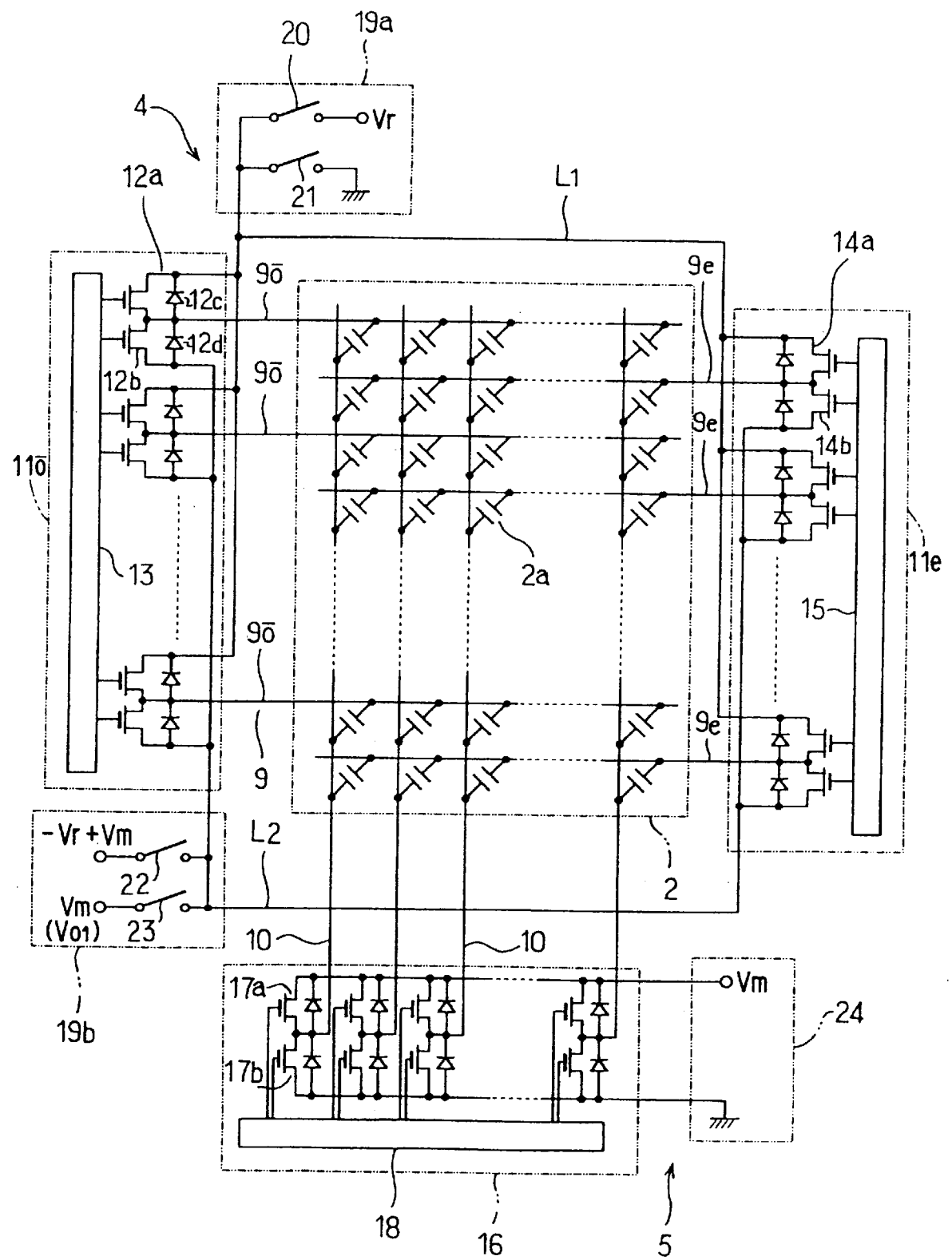
FIG. 2 is an electric configuration of display unit including an EL panel, a scanning driver and a data driver shown in FIG. 1.

As shown in FIG. 2, the EL panel 2 is formed by arranging scanning electrodes (transparent electrodes) 9 and data electrodes (back electrodes) 10 in lattice shape, so that EL elements 2a shown by using a symbol of capacitor are formed at intersections between the scanning electrodes 9 and the data electrodes 10. Here, odd number order scanning electrodes 9 are described as scanning electrodes 9o, and even number order scanning electrodes 9 are described as scanning electrodes 9e.

A scanning electrode driving circuit 11o is a push-pull type driving circuit, and is provided with a P-channel type FET 12a and an N-channel type FET 12b which are connected to the scanning electrode 9o. The scanning electrode driving circuit 11o applies scanning voltage to the scanning electrode 9o based on signal from a driving circuit 13. Parasitic diodes 12c and 12d are formed between each source and drain of the FET 12a and 12b, so that the scanning electrode 9o is set to a desired standard voltage.

A scanning electrode driving circuit 11e has a similar structure, and has a P-channel type FET 14a, an N-channel type FET 14b, and a driving circuit 15. The scanning electrode driving circuit 11e applies scanning voltage to the scanning electrode 9e. A data electrode driving circuit 16 also has a P-channel type FET 17a, an N-channel type FET 17b, and a driving circuit 18. The data electrode driving circuit 16 applied data voltage to the data electrode 10.

Scanning voltage supply circuits 19a and 19b are connected to the scanning electrode driving circuits 11o and 11e. The scanning voltage supply circuit 19a has switching elements 20 and 21, and supplies one of direct voltage (writing voltage) Vr and ground voltage to a P-channel FET source side common line L1 in the scanning electrode driving circuits 11o and 11e, depending on on/off condition of the switching elements 20 and 21. Similarly, the scanning voltage supply circuit 19b has switching elements 22 and 23, and supplies one of direct voltage (−Vr+Vm) and Vm to an N-channel FET source side common line L2 in the scanning electrode driving circuits 11o and 11e, depending on on/off condition of the switching elements 22 and 23.

A data voltage supply circuit 24 is connected to the data electrode driving circuit 16 to supply direct voltage (modulation voltage) Vm to a P-channel FET source side common line of the data electrode driving circuit 16, and to supply the ground voltage to an N-channel FET source side common line.

Here, in the above structure, the scanning electrode driving circuits 11o and 11e and the scanning voltage supply circuits 19a and 19b correspond to the scanning driver 4; and the data electrode driving circuit 16 and the data voltage supply circuit 24 correspond to the data driver 5.

Basic operations of the scanning driver 4 and the data driver 5 are described in JP A 9-212129 which corresponding to U.S. Pat. No. 5,973,456 and JP B 2914234 which corresponding to U.S. Pat. No. 5,847,516 and U.S. Pat. No. 6,064,158. The contents of which are incorporated herein by reference. Hereinafter, these operations will be briefly explained.

It needs to apply alternating pulse voltage between the scanning electrode 9 and the data electrode 10 to emit the EL element of the EL panel 2. Therefore, pulse voltage whose polarity reverses every field is generated and is applied to each scanning electrode. In a positive field, the standard voltage of each electrode is set to an offset voltage Vm having around 45 V, and then the voltage Vr having around 210 V is sequentially applied to the scanning electrodes 9. Here, the other scanning electrodes to which the voltage Vr is not applied is set to a floating condition.

At a side of the data electrodes 10, the data electrodes 10 connected to the EL elements to be emitted are set to the ground voltage, so that the voltage Vr equal to or higher than a threshold voltage is applied to the both ends of the EL elements to be emitted. On the other hands, the data electrode 10 connected to the EL elements to be not emitted are kept to Vm. In this case, the voltage applied between the both ends of the EL elements becomes (Vr−Vm) which is lower than the threshold voltage. Therefore, these EL elements are not emitted. After that, charged charge in each EL element is discharged so as to return to an initial condition.

On the contrary, in a negative field, similar operation is performed by reversing the polarity of the applied voltage. In this time, the standard voltage of each electrode is the ground voltage. The voltage (−Vr+Vm) is applied to the scanning electrodes 9 so that the scanning electrodes 9 are scanned. At a side of the data electrodes 10, opposite from the positive field, the data electrodes 10 connected to the EL elements to be emitted are set to the voltage Vm, and the data electrode 10 connected to the EL elements to be not emitted are set to the ground voltage. As a result, the voltage applied to the both ends of the EL elements to be emitted becomes −Vr, and the EL elements emit. On the contrary, since the voltage applied to the both ends of the EL elements to be not emitted is kept to (−Vr+Vm) which is lower than the threshold voltage, and the EL elements do not emit. Thus, two cycles display operations completes with these positive and negative field drivings. The EL panel 2 displays pictures by repeatedly performing the two cycles display operations.

Figure 3:
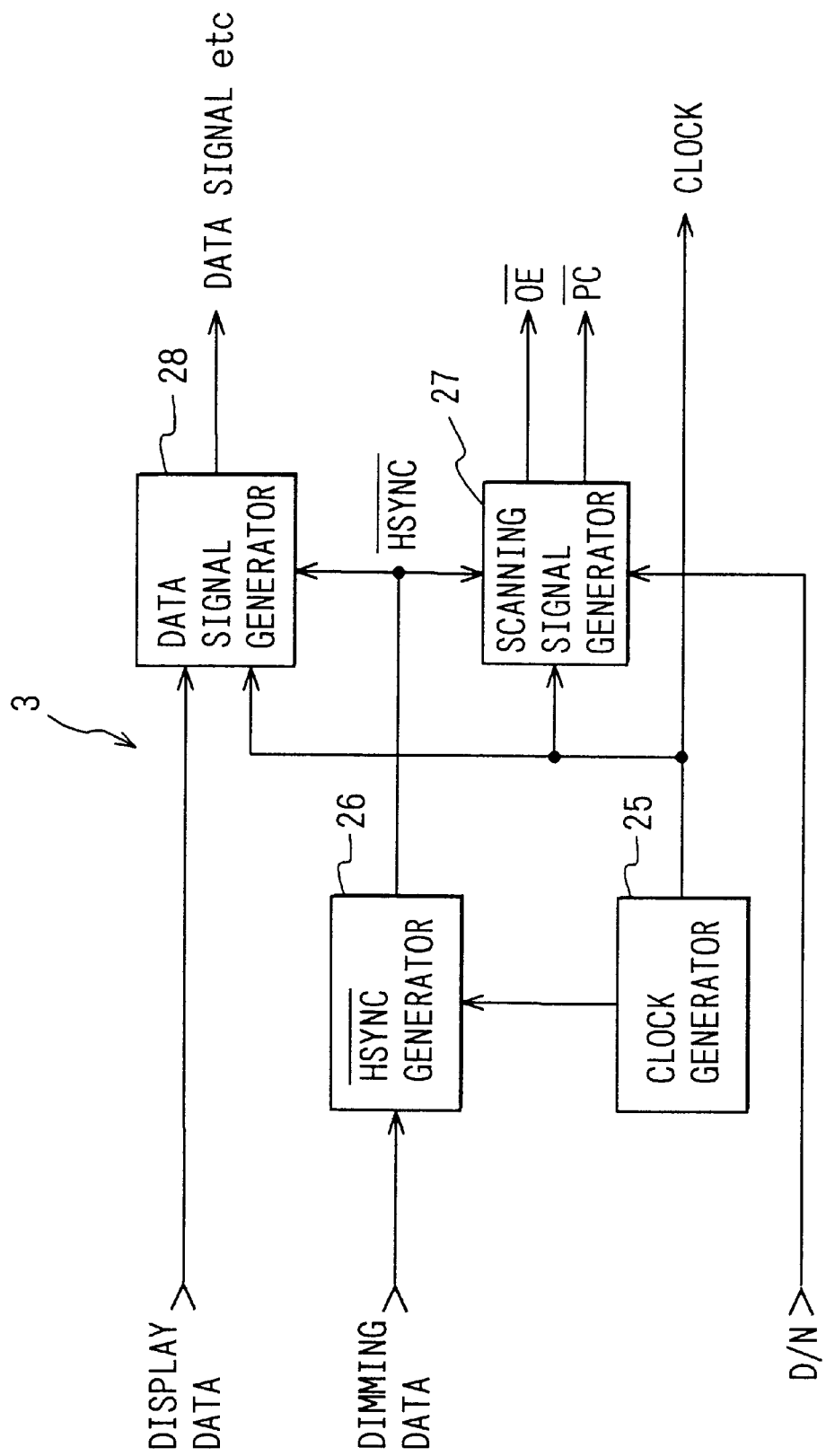
FIG. 3 is a schematic functional block diagram illustrating a controller shown in FIG. 1.

As shown in FIG. 3, the controller 3 is provided with a CLOCK signal generator 25, a $\overline{\text{HSYNC}}$ (HSYNC bar) signal generator (first dimming controlling means) 26, a scanning signal generator (second dimming controlling means) 27, and a data signal generator 28. The clock signal generator 25 generates CLOCK signal having a frequency of, for example, 5 MHz, and supplies it to other generators 26–28 and to external driving circuit 6.

The HSYNC bar signal generator 26 determines a driving frequency of the EL panel 2 within around 60 Hz to around 480 Hz, depending on the dimming data outputted from the ECU 1, generates and outputs the HSYNC bar signal. The HSYNC bar signal is a timing signal for scanning each scanning electrode 9 depending on the driving frequency. The data signal generator 28 converts the display data, outputted from the ECU 1, for the EL panel 2 into a predetermined format, and outputs it to the data driver 5. The data signal generator 28 further generates control signal for data side and outputs it to the data driver 5.

Figure 4:
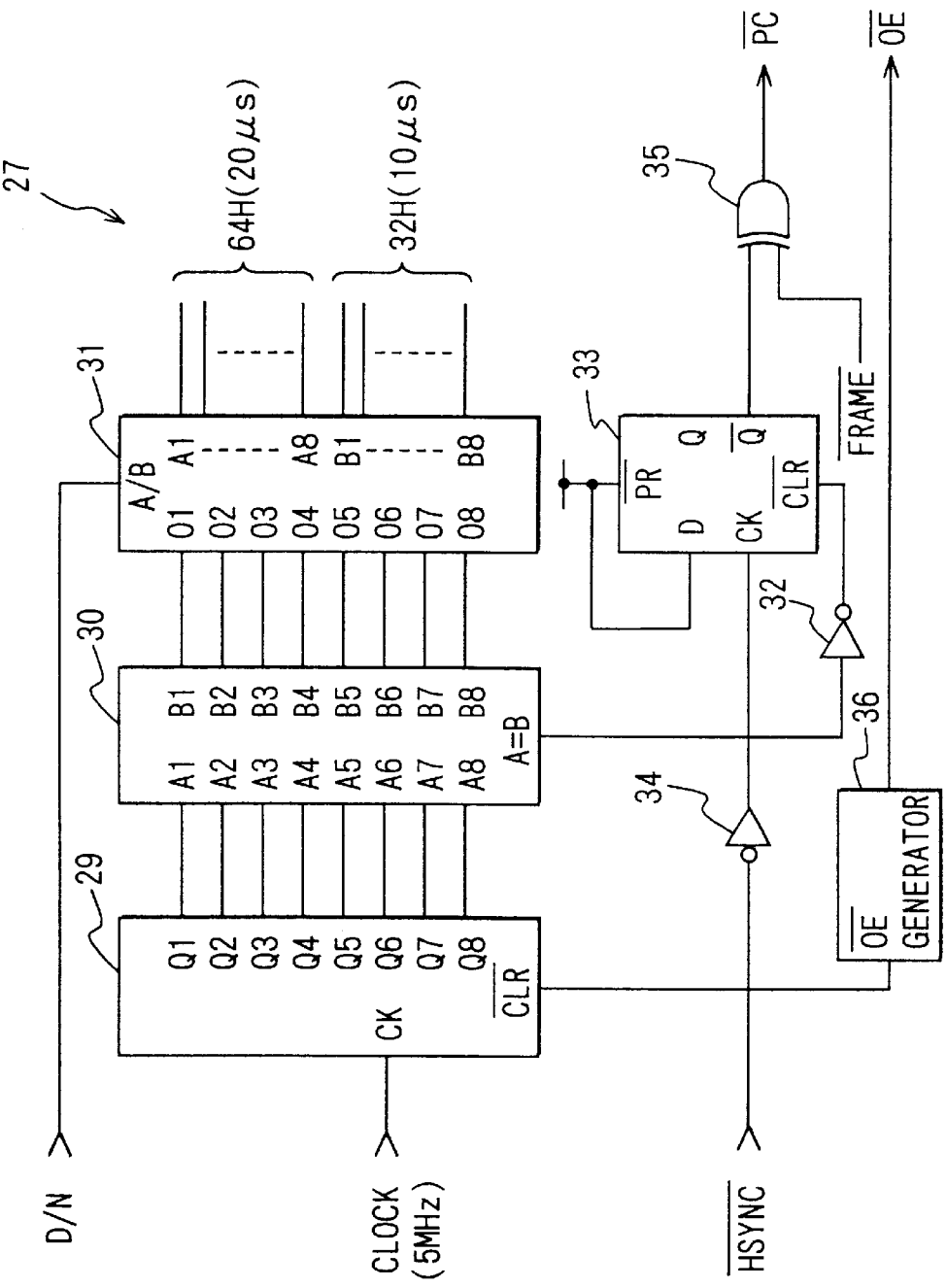
FIG. 4 is an electric configuration of a scanning signal generator shown in FIG. 3.

As shown in FIG. 4, the scanning signal generator 27 includes a counter 9, a comparator 30 and a selector 31. The counter 29 is cleared with a falling of the HSYNC bar signal, and counts up the number of inputted pulse of the CLOCK signal. A count data of the counter 29 is outputted to an A-side terminal of the comparator 30. A B-side terminal of the comparator 30 is connected to an O-output terminal of the selector 31.

Data 64H and 32H are respectively outputted to the A-input terminal and B-input terminal of the selector 31. Day/night switching signal D/N is inputted to the selector 31. Being low level, the day/night switching signal D/N indicates "daytime". Being high level, the day/night switching signal D/N indicates "nighttime". When the day/night switching signal D/N having the low level is inputted to the selector 31, the selector 31 selects the data 64H which is inputted to the A-input terminal, and outputs the data 64H to the O-output terminal. When the day/night switching signal D/N having the high level is inputted to the selector 31, the selector 31 selects the data 32H which is inputted to the B-input terminal, and outputs the data 32H to the O-output terminal.

Coincident signal terminal (A=B) of the comparator 30 is connected to a CLR terminal of a D-flip flop 33 via a NOT gate 32. A D-terminal and a PR-terminal of the D-flip flop 33 are connected to a power supply. The HSYNC signal is outputted to a CK-terminal via the NOT gate 34. A Q-terminal (Q-bar terminal) of the D-flip flop 33 is connected to one input terminal of an EXOR gate 35. $\overline{\text{FRAME}}$ (FRAME bar) signal is inputted to another input terminal of the EXOR gate 35. Level of the FRAME bar signal corresponds to the positive or negative field. PC signal is outputted from the EXOR gate 35.

Here, the HSYNC bar signal is also inputted to an input terminal of an $\overline{\text{OE}}$ (OE bar) signal generator 36. The OE bar signal generator 36 starts up in synchronized with a falling of the HSYNC bar signal. After a predetermined time has passed, the OE bar signal generator 36 outputs $\overline{\text{OE}}$ (OE bar) signal.

The OE bar signal and the PC bar signal outputted from the scanning signal generator 27 in the controller 3 are inputted to the FET 12a and 12b as their gate signal via logic circuit portions in the driving circuits 13 and 15 in the scanning driver 4. Line selection signal outputted from a scanning driver IC such as $\mu$ PD16302 is inputted to the logic circuit portion to sequentially selecting the scanning electrodes 9 (scanning line to be displayed).

Output signal O of the FET 12a and 12b corresponding to particular scanning electrode 9, whose line selection signal is active, is determined as follows depending on the level of the OE bar signal and the PC bar signal.

| OE bar signal | PC bar signal | Output signal O |
|---|---|---|
| Low | High | High |
| Low | Low | Low |

Figure 5:
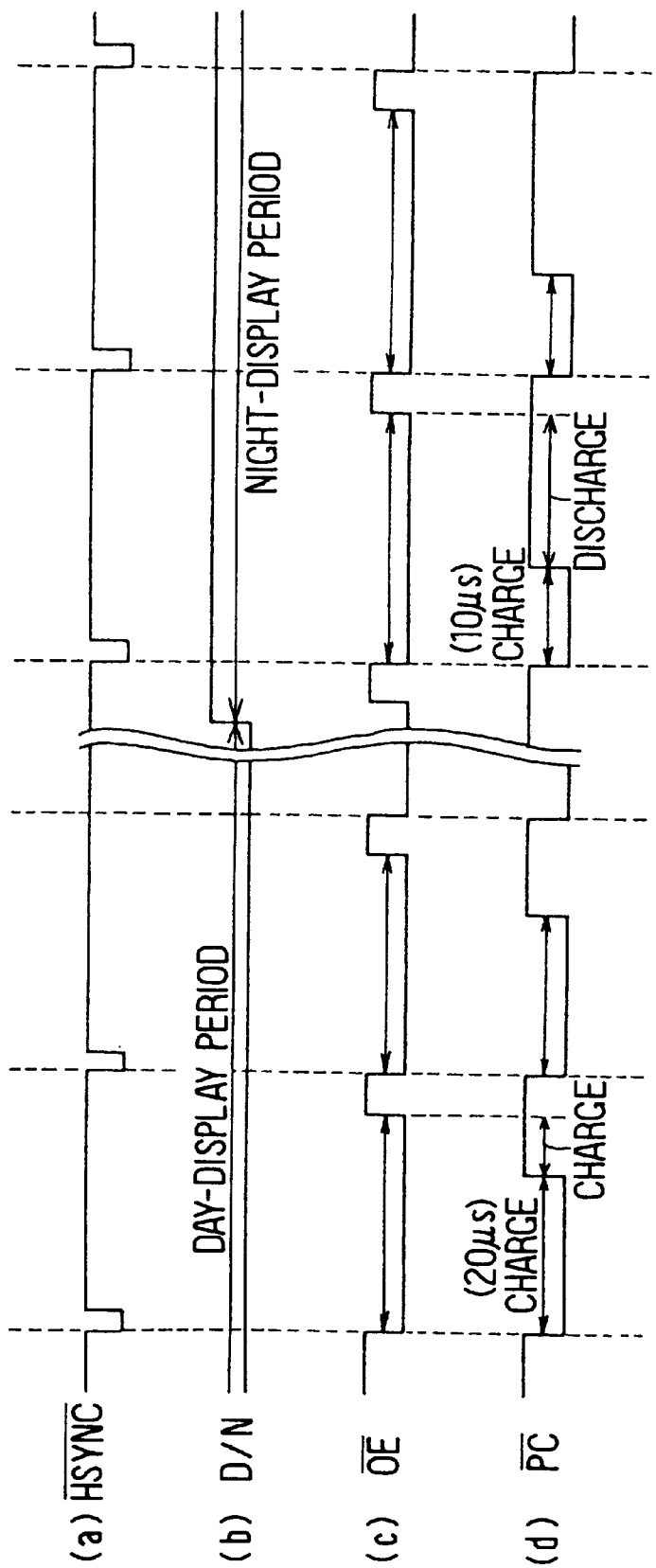
FIG. 5 is a timing chart of pulse width control signal shown in FIG. 4.

For example, a timing chart shown in FIG. 5 illustrates a case of the negative field. In this case, when both of the OE bar signal and the PC bar signal are low level, the FET 12b of the scanning driving circuit 11o is turned on, and then the output signal becomes low (in this case, −Vr+Vm). When the voltage Vm is applied to the data electrodes 10, the EL element 2a corresponding to the selected data electrode is charged and emits. After that, when the PC bar signal is changed to the high level, the output signal O becomes high level, and the FET 12a is turned on. As a result, the charged electron in the EL element 2a is discharged, and then the EL element 2a is turned off (becomes non-display condition). JP A 9-212129 described before also shows these operation in more detail.

Figure 6:
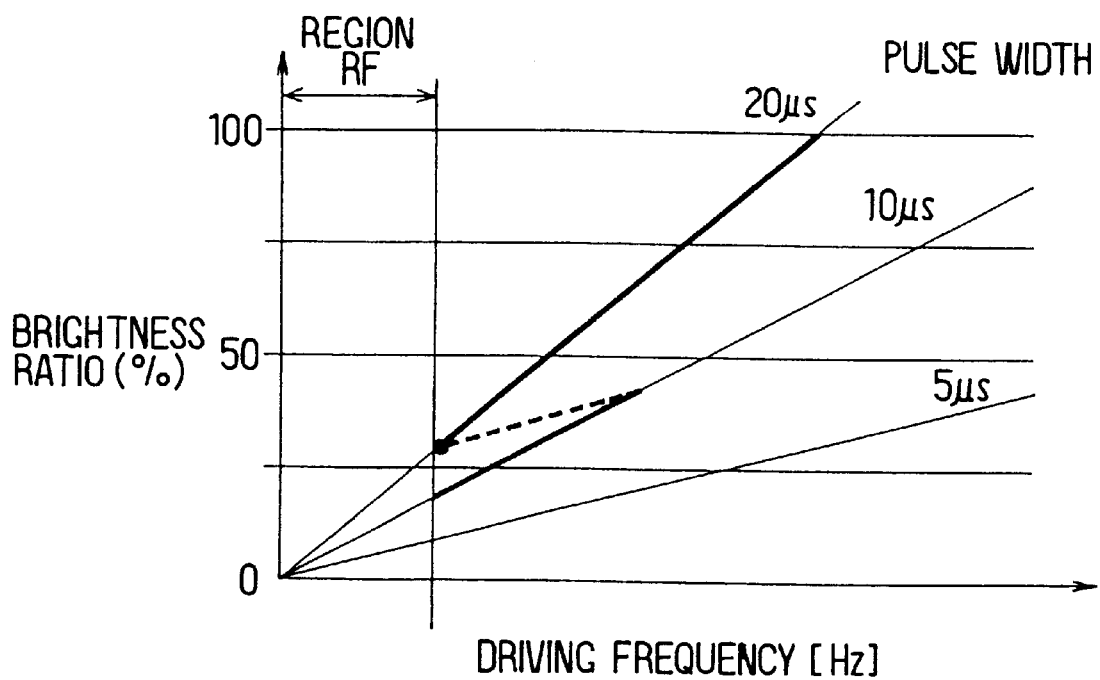
FIG. 6 is a graph illustrating a relationship between a driving frequency and a brightness ratio of the EL panel, when a pulse width of an applied voltage is changed.
Figure 7:
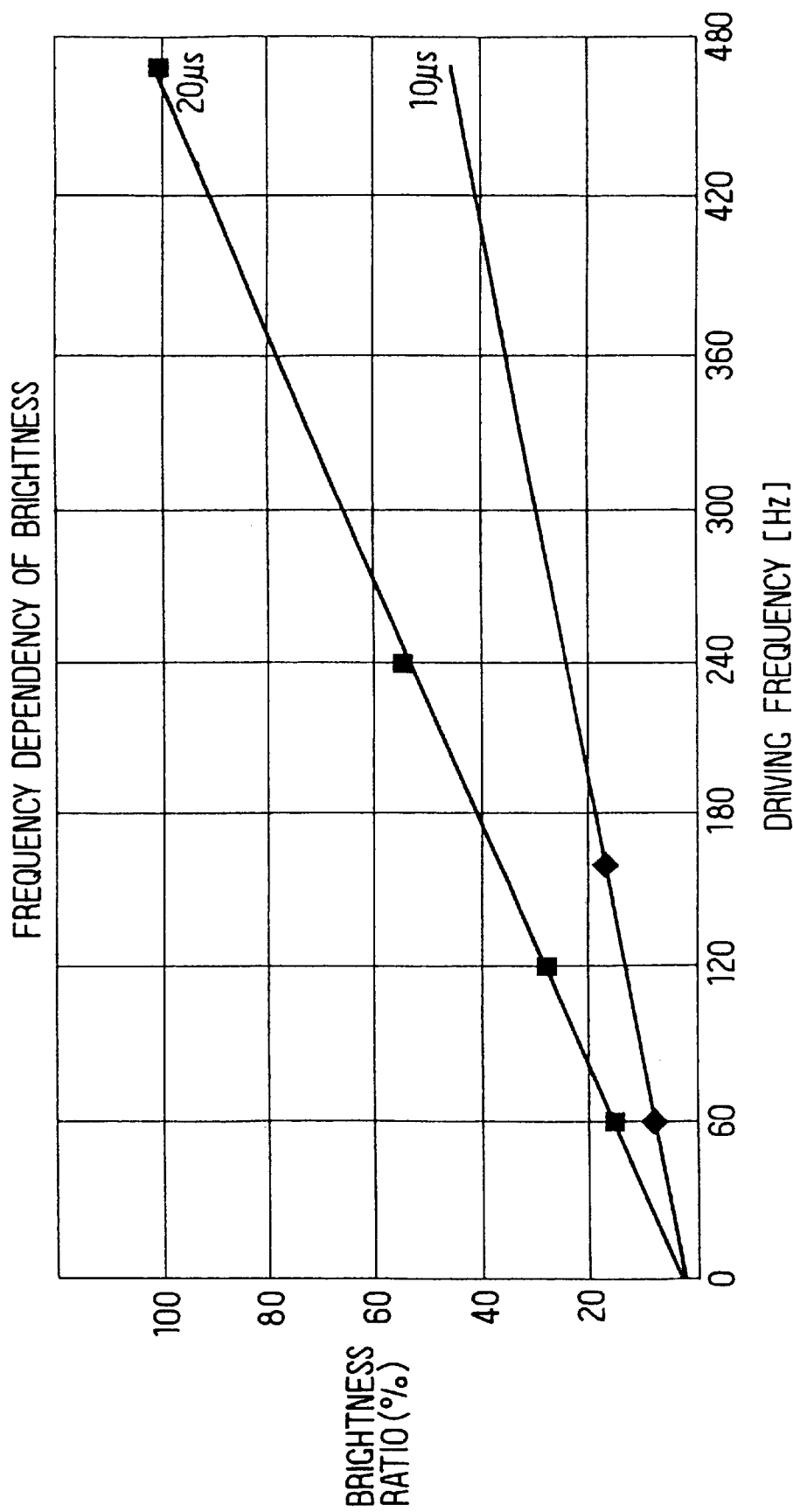
FIG. 7 is a graph illustrating a practical example when the pulse width of an applied voltage and the driving frequency is changed.
Figure 8:
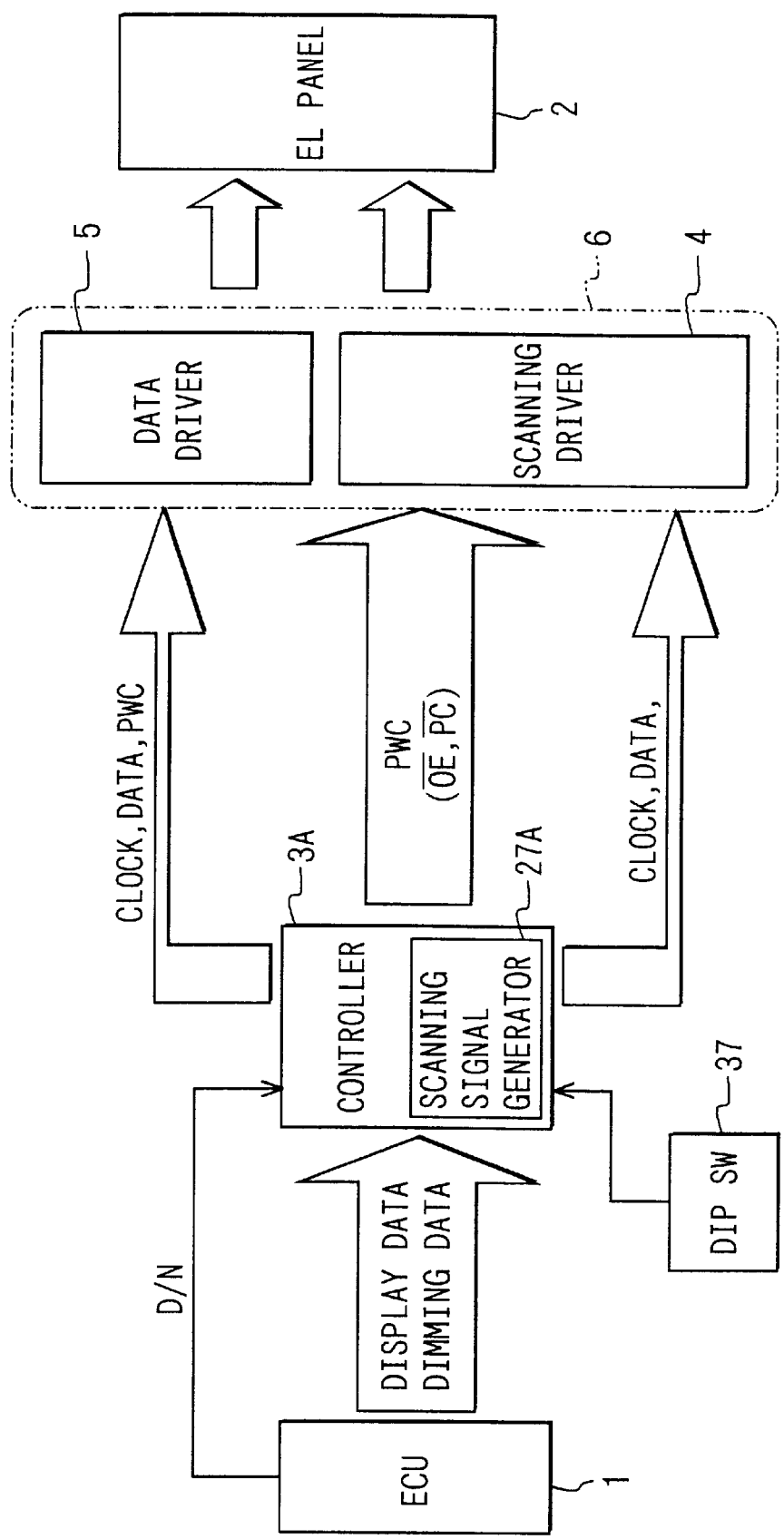
FIG. 8 is a schematic functional block diagram illustrating a driving apparatus for vehicular display unit of a second embodiment according to the present invention.

Next, operation of this embodiment will explained with reference to FIGS. 3 to 5. FIG. 6 shows a changing characteristic of brightness (L [%]) of the EL panel with respect to changes of the driving frequency (f [Hz]), when the pulse width of the applied voltage, in detail a pulse width of low-level PC bar signal (5$\mu$s, 10 $\mu$s, 20 $\mu$s) is changed as a parameter. As shown in FIG. 6, each f-L characteristic at each pulse width is substantially linear. A region RF in FIG. 6 is a region in which flicker occurs. Approximately 60 Hz is a lower limit in which an excellent visibility can be secured. Here, when the driving frequency is constant, however the changes of the brightness with respect to the changes of the pulse width is not linear, the brightness constantly increases.

As described before, when the display condition of the instrument panel is switched from a daytime display condition to a nighttime display condition, it needs to largely decrease the brightness of the panel. Moreover, when the pulse width is constant (e.g., 20 $\mu$s), even if the driving frequency is decreased in order to reduce the brightness, it is difficult to decrease lower than approximately 20% due to the limitation at 60 Hz.

Therefore, according to this embodiment, when the day/night switching signal D/N is low level indicating "daytime", or when a lighting switch is turned off (also indicating as "daytime"), the controller 3 sets the pulse width to 20 $\mu$s constant and varies the driving frequency within approximately 480 Hz to approximately 60 Hz. As a result, the controller 3 performs the dimming control so that a brightness ratio is within 100% to approximately 20%.

On the contrary, when the day/night switching signal D/N is high level indicating "nighttime", or when the lighting switch is tuned on (also indicating as "nighttime", the controller sets the pulse width to 10 μs constant and widely changes the changing range of the brightness. At the same time, the controller 3 varies the driving frequency within approximately 160 Hz to approximately 60 Hz. As a result, the controller 3 performs the dimming control so that a brightness ratio is within approximately 20% to approximately 10%.

In more detail, as shown in FIG. 5, when the day/night switching signal D/N is low level, the selector 31 selects the data 64H, and then the scanning signal generator 27 of the controller 3 operates as following sequences. Here, it is assumed that the D-flip flop is cleared in advance.

(1) The counter 29 is cleared in response to the falling of the HSYNC bar signal, and the OE bar signal outputted from the OE bar signal generator 36 falls. The clock pulse is inputted to the CK-terminal of the D-flip flop 33, and the level of the Q bar terminal is changed from high to low. In the case of the negative field, since the FRAME bar signal is low level, the PC bar signal which is output signal from the EXOR gate 35 is also changed from high to low.

(2) When the count value of the counter 29 reaches 64H, the coincident signal terminal (A=B) of the comparator 30 becomes low level. Then, the D-flip flop 33 is cleared, and the level of the Q bar terminal is changed from low to high. As a result, the PC bar signal also changes from low to high.

This timing corresponds to a low-level period of the PC bar signal. The period is 0.2 μs×100 (64H)=20 μs.

(3) After a predetermined time has passed, the OE bar signal outputted from the OE bar signal generator 36 rises.

On the contrary, when the day/night switching signal D/N is high level ("nighttime"), since the data 32H inputted to the B-input terminal is selected, the low-level period of the PC bar signal in the above (1) and (2) is 0.2 μs×50 (32H)=10 μs.

In this way, a charging time of the EL element 2a during a daytime display period is controlled to 20 μs; and the charging time during a night display period is controlled to 10 μs.

Here, when the user or the like operates an adjusting volume (not shown) to dim the EL panel 2 during either the daytime display period or the nighttime display period, an operation signal is supplied to the HSYNC bar signal generator 26 of the controller 3 as the dimming data via the ECU 1. Then, the HSYNC bar signal generator 26 sets the driving frequency of the EL panel 2 to within 60–480 Hz in accordance with the dimming data, and outputs the HSYNC bar signal depending on the driving frequency.

In detail, when the driving frequency is high, output interval of the HSYNC bar signal becomes shorter; and when driving frequency is low, output interval of the HSYNC bar signal becomes longer. Therefore, the brightness of the EL panel 2 can dimmed substantially linearly.

According to this embodiment, the controller 3 changes the charging period of the EL element 2a by changing the pulse width of the PC bar signal as the parameter in the scanning signal generator 27, so that the display condition of the EL panel 2 is switched between the daytime display condition and the nighttime display condition. In each of the daytime display period and the nighttime display period during which the dimming control is required to be performed in multi steps with a relatively small changing step, the controller 3 changes the driving frequency as the parameter in the HSYNC bar signal generator 26.

In more detail, since the controller 3 selectively performs the dimming control suitable for adjusting brightness range in accordance with the time, the place, and the occasion, the dimming control of the EL panel 2 as the vehicular display unit can be adequately performed through daytime and nighttime. Even when the EL panel 2 deteriorates with time, a relationship between the driving frequency and the brightness of the EL panel 2 keeps the substantial linearity. Therefore, this method in which the driving frequency is changed is suitable, because the deterioration with time does not affect when the multi steps dimming control is performed.

In addition, when the EL panel 2 deteriorates with time, the relationship between amount of charge to the EL element 2a and the brightness of the EL element 2a also deteriorate. However, when the brightness range is widely switched by largely changing with relatively large steps by switching between the daytime display period and the nighttime display period, as described in this embodiment, almost all people may not recognize such a small deterioration.

Second Embodiment

In this second embodiment, the controller 3 in the first embodiment is replaced with a controller (display control means) 3A. A 2-bits DIP switch 37 is connected to an input port of the controller 3A. A scanning signal generator (second dimming control means) 27A includes a selector instead of the selector 31. The selector of this embodiment is for selecting one of four input terminals A, B, C and D, depending on an ON/OFF condition of the DIP switch 37, and outputs to the B-terminal of the comparator 30 (not shown).

Figure 9:
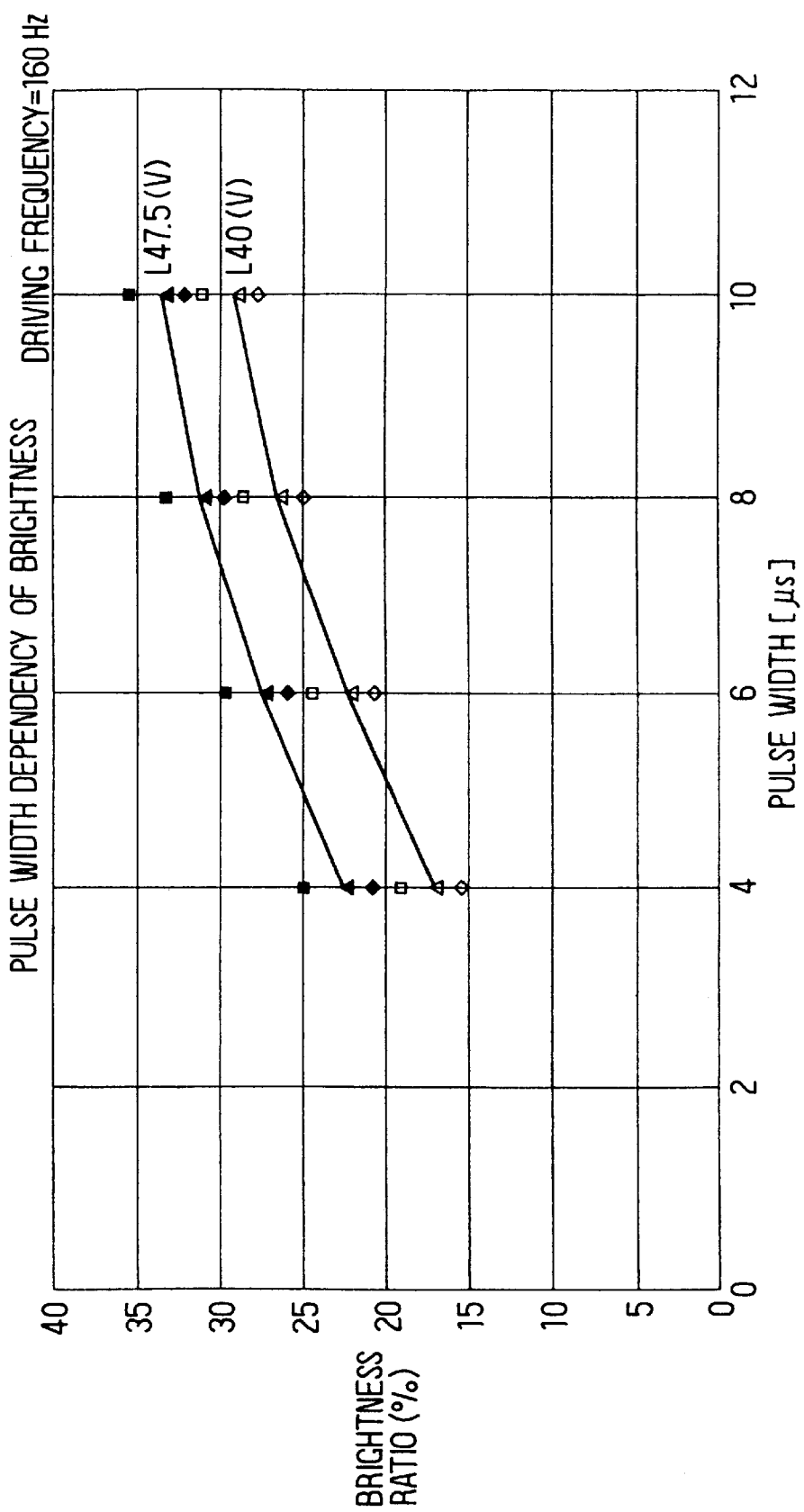
FIG. 9 is a graph illustrating a relationship between the pulse width and the brightness ratio of the EL panel, when the driving frequency is set to 160 Hz.

Operation of this embodiment will be explained with reference to FIG. 9. FIG. 9 shows changes of the brightness ratio (vertical axis) when the pulse width of the PC bar signal is changed (horizontal axis) when the driving frequency is kept to 160 Hz regarding plural EL panel samples. Here, the brightness ratio is calculated so that the brightness ratio becomes 1.0 when the driving ratio is 160 Hz, the pulse width of the PC bar signal is 20 μs. Furthermore, each sample is measured under conditions where the basic voltage (offset voltage Vm) of each electrode is 47.5 V and 40 V for one sample.

For example, when the basic voltage is 47.5 V and the pulse width is 10 μs, the brightness ratio is approximately 36% for the first sample indicated by "■", and is approximately 32% for the second sample indicated by "♦". As understood from this, the brightness ratio of this condition causes deviation for every sample. Here, it assumes that, for example, approximately 33% is the most preferable value when the pulse width is 10 μs. In order to switch the display condition of the EL panel, wherein the EL panel has been driven with the pulse width of 20 μs during the daytime display period, to the nighttime display condition, the pulse width for the sample "■" during the nighttime display period can be slightly reduced to approximately 8 μs. On the contrary, the pulse width for the sample "♦" during the nighttime display period can be slightly increased to approximately 12 μs, for example. In this way, the brightness ratio between during the daytime display period and that during the nighttime display period are controlled to substantially the same by slightly adjusting the pulse width during the nighttime display period.

In detail, in the controller 3A, similar to the selector 31 in the first embodiment, the data 64H and 32H are set to the A-input terminal and the B-input terminal, and the data 28H and 3CH which corresponding to the pulse width of 8 μs and 12 μs are set to the C-input terminal and the D-input terminal.

When the EL panel 2 is switched to the nighttime display condition (the day/night switching signal D/N is high level), the data value to be selectively outputted to the output terminal O of the data selector is switched as follows, depending on the ON/OFF condition of the DIP switch 37.

| DIP switch 37 | Output terminal O |
|---|---|
| 00 | B: 32H |
| 01 | C: 28H |
| 10 | B: 3CH |

Therefore, the brightness ratio of each EL panel 2 is measured during, for example, manufacturing. After that, the ON/OFF of the DIP switch is determined depending on the measured result. Thus, the deviation of the brightness characteristic among each EL panel 2 can be adjusted.

According to the second embodiment, the scanning signal generator 27A selects one of plural dimming steps depending on the ON/OFF of the DIP switch 37. Therefore, even if each of the EL panels 2 has difference in brightness characteristic, each EL panel can be adjusted in advance so that a brightness range between the daytime display condition and the nighttime display condition can be adequately switched.

The present invention can be modified and expanded as follows. Similar control may be applied to the data electrode side instead of the scanning electrode side. The amount of charge to the EL element 2a can be varied by changing a charging voltage, instead of the charging time. An ON/OFF signal from a lighting switch may be directly used as the day/night switching signal D/N. The vehicular display unit is not limited to the EL panel 2 as long as a display unit in which capacitor type load picture element is formed at the intersection of the scanning electrode and the data electrode. Furthermore, the display unit is not limited to the matrix type display unit such as the EL panel 2 as long as it is driven by using the scanning electrode and the data electrode, such as segment type display unit.

What is claimed is:

1. A driving apparatus for display unit including plural scanning electrodes, plural data electrodes and plural picture elements defined at intersections of the scanning electrodes and the data electrodes, the driving apparatus comprising:
   a first dimming controller for dimming the display unit by changing a first parameter;
   a second dimming controller for dimming the display unit by changing a second parameter;
   a display controller for switching a display condition of the display unit between a daytime display condition and a nighttime display condition, the display controller controlling the first dimming controller to dim the display unit during both a daytime display period and a nighttime display period, and the display controller controlling the second dimming controller to dim the display unit when the display condition of the display unit is switched between the daytime display condition and the nighttime display condition.

2. The driving apparatus according to claim 1, wherein the first dimming controller dims the display unit by changing a frequency of an applied voltage to the picture elements.

3. The driving apparatus according to claim 1, wherein the second dimming controller dims the display unit by changing an amount of charge charged in the picture elements.

4. The driving apparatus according to claim 3, wherein the second dimming controller dims the display unit by changing a charging time of the picture elements.

5. The driving apparatus according to claim 1, wherein the second dimming controller selects one of plural dimming steps to dim the display unit.

6. The driving apparatus according to claim 1, wherein the display unit is an EL panel.

7. A driving apparatus for display unit including plural scanning electrodes, plural data electrodes and plural picture elements defined at intersections of the scanning electrodes and the data electrodes, the driving apparatus comprising:
   a signal generator for generating signals supplied to at least one of the scanning electrodes and the data electrodes;
   a driving frequency changing unit connected to the signal generator, for changing a frequency of the signals; and
   a pulse width changing unit connected to the signal generator, for changing a pulse width of the signals depending on a day/night switching signal which indicating one of daytime and nighttime,
   wherein the driving frequency changing unit dims the display unit in plural dimming steps, during both a daytime display period and a nighttime display period, and
   the pulse width changing unit dims the display unit when the display condition of the display unit is switched between the daytime display condition and the nighttime display condition.

8. The driving apparatus according to claim 7, wherein the display unit is an EL panel.

9. A driving apparatus for display unit including plural scanning electrodes, plural data electrodes and plural picture elements defined at intersections of the scanning electrodes and the data electrodes, the driving apparatus comprising:
   a scanning signal generator for generating scanning signals supplied to the scanning electrodes;
   a driving frequency changing unit connected to the scanning signal generator, for changing a frequency of the scanning signals; and
   a pulse width changing unit connected to the scanning signal generator, for changing a pulse width of the scanning signals depending on a day/night switching signal which indicating one of daytime and nighttime,
   wherein the driving frequency changing unit dims the display unit in plural dimming steps, during both a daytime display period and a nighttime display period, and
   the pulse width changing unit dims the display unit when the display condition of the display unit is switched between the daytime display condition and the nighttime display condition.

10. The driving apparatus according to claim 9, wherein the display unit is an EL panel.

* * * * *